May 10, 1966
H. JACOBSON ET AL
3,250,387
REUSABLE BLISTER PACKAGE
Filed Sept. 30, 1964
2 Sheets-Sheet 1
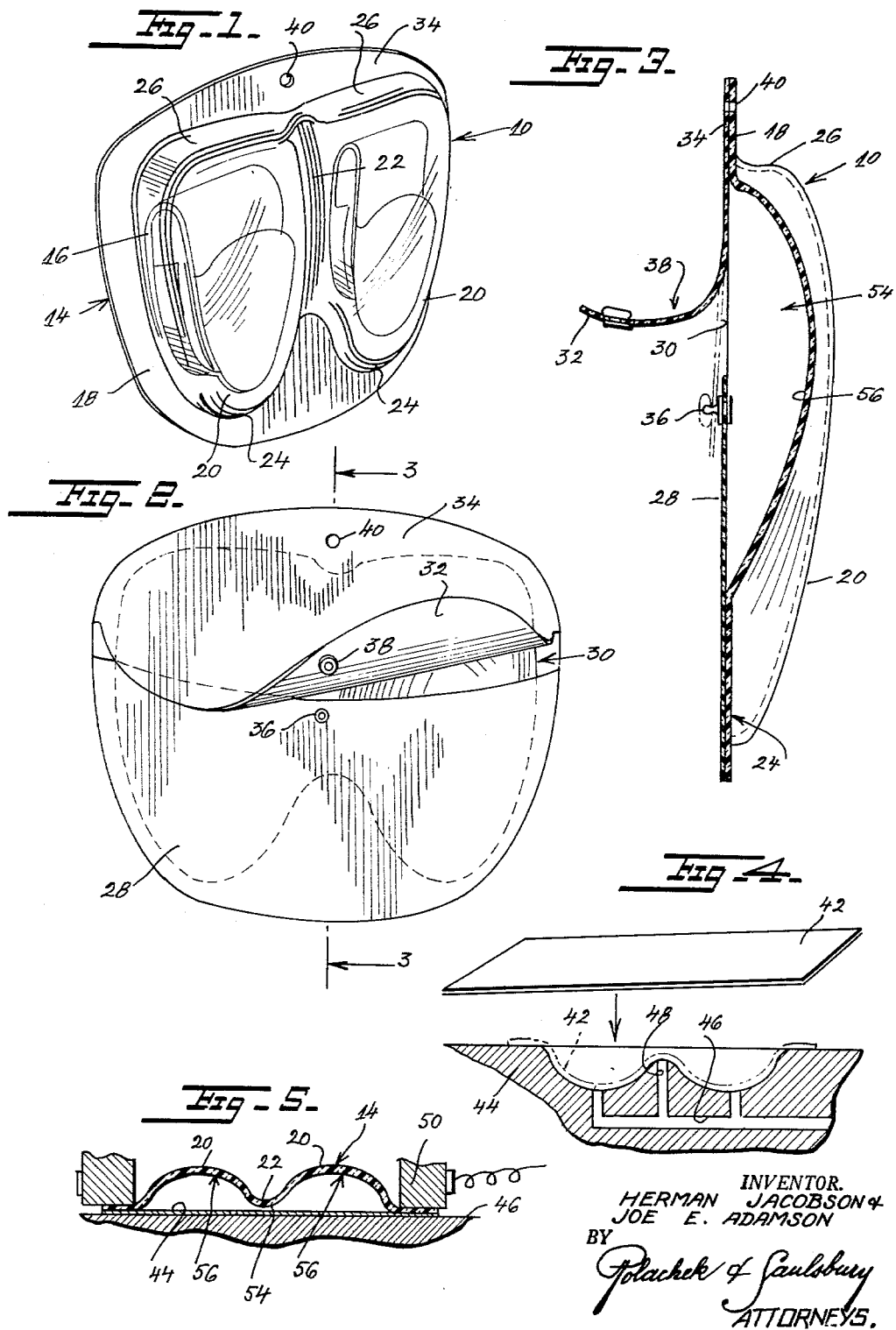
INVENTOR.
HERMAN JACOBSON &
JOE E. ADAMSON
BY
Polachek & Saulsbury
ATTORNEYS.

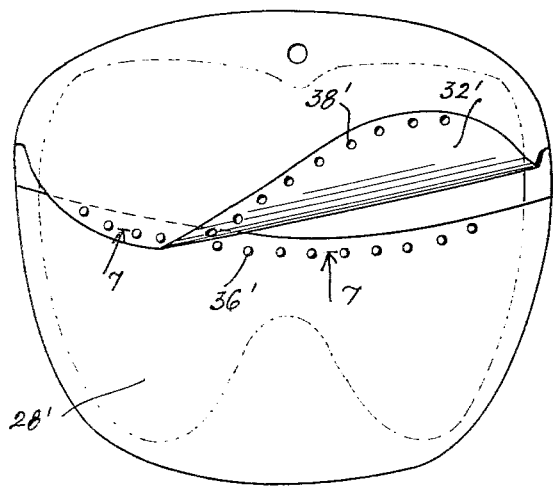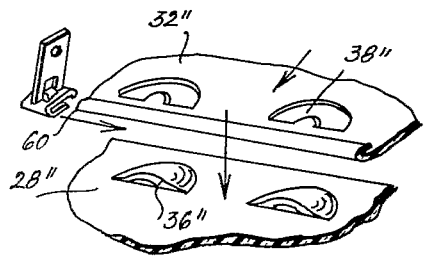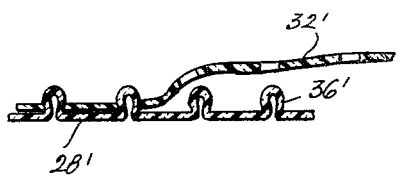

United States Patent Office 3,250,387
Patented May 10, 1966

3,250,387
REUSABLE BLISTER PACKAGE
Herman Jacobson, Larchmont, and Joe E. Adamson, Portchester, N.Y., assignors to Prepac, Inc., New York, N.Y., a corporation of New York
Filed Sept. 30, 1964, Ser. No. 400,355
6 Claims. (Cl. 206—78)

This invention relates generally to the packaging art and more particularly to a new method of manufacturing a plastic blister type container and package for packaging and displaying articles of manufacture, and to the product thereof.

Heretofore plastic blister packages have been formed by shaping the plastic blister material into shallow blisters forming pockets leaving the back open. The article to be packaged was then fitted into the blister pockets and finally a cardboard was sealed to the edge of the plastic material closing the opening in the back. Such a package sealed the article inside the package making it inaccessible for inspection or examination and necessitating destroying the package in order to get access to the article for removal. Such an operation is laborious, inconvenient, time consuming and expensive.

It is an important object of the present invention to provide a transparent plastic package of the blister type wherein access can readily be had to the article therein for inspection, examination or removal.

Another important object of the invention is to provide a transparent plastic package of the blister type with a front side formed of semirigid plastic material and with a rear closure side formed of flexible plastic material, said front and rear sides defining a shallow three-dimensional compartment for containing an article, the rear closure side being readily openable.

Still another object of the invention is to provide a transparent plastic package of the blister type with a front side formed of semirigid plastic material and with a rear closure side formed of flexible plastic material, said front and rear sides defining a shallow three-dimensional compartment containing the article being displayed, the rear closure side being formed with an openable flap.

Yet another object of the invention is to provide a blister type plastic container with a front side formed of semirigid plastic material and with a rear closure side formed of flexible plastic material, said front and rear sides defining a shallow three-dimensional compartment, the rear closure side being formed with an openable flap.

Still another object of the invention is to provide a transparent plastic container of the blister type that can be reused.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a front perspective view of a blister type package, embodying the invention.

FIG. 2 is a rear elevational view thereof, the closure flap being shown partly open, the article being omitted.

FIG. 3 is an enlarged vertical sectional view taken on the line 3—3 of FIG. 2.

FIG. 4 is a part sectional and part top plan view showing a step in the method of manufacturing the package.

FIG. 5 is a sectional view showing another step in the manufacture of the package.

FIG. 6 is a view similar to FIG. 2 showing a modified manner of fastening the closure flap, parts being shown broken away.

FIG. 7 is an enlarged sectional view taken on the line 7—7 of FIG. 6.

FIG. 8 is a top perspective view of another modified manner of fastening the closure flap, an operating tool being shown preparatory to interlocking the flap in closed position.

Referring now in detail to the various views of the drawings, in FIG. 1 there is illustrated a package of the blister type made in accordance with the invention and designated generally at 10. The package 10 comprises a container 14 and an article of manufacture therein, the article being shown as a lady's shoe 16. The container 14 is formed entirely of a suitable transparent plastic material, such as vinyl or acetate.

The container 14 comprises a flat front wall 18 formed of semirigid plastic material. The front wall is formed by molding a flat panel with a pair of elongated substantially oval-shaped swellings in the form of blisters 20, 20 separated by a shallow groove 22, extending lengthwise of the container. The bottom ends of the blisters are narrow and formed with blunted points 24, 24 and the top ends 26, 26 are straight and wider.

A rear panel 28 of flexible plastic material is sealed to the sides and bottom edges of the front wall 18, the upper end edge of the panel being unattached. The rear panel extends to a point remote from the top edge leaving an open space 30 thereat. This space is closed by a flap 32 of the same plastic material as the rear panel 28. The top edge and adjacent side edges of the flap are sealed to the rear surfaces of the edges of the front wall 18 as indicated at 34, leaving the lower edge of the flap as viewed in FIG. 2 unattached. A male snap fastener element 36 is suitably secured to the rear panel adjacent its top edge centrally thereof and is adapted to coact with a female snap fastener element 38 carried by the flap 32 adjacent its bottom edge centrally thereof in order to fasten the flap to the rear panel. A hole 40 is formed in the top sealed edges of the front wall and rear panel for hanging the package on a nail or the like.

In the manufacture of the plastic container 14, a heated sheet 42 of suitable semirigid plastic material is placed over a suitable mold 44 having a passage 46 leading to a vacuum pump and having branch passages 48 leading to hills and dales in the mold as shown in FIG. 4. When the pump is operated the heated sheet 42 is drawn downwardly conforming to the shape of the hills and dales of the mold as shown in FIG. 4, thus forming the front wall 18 of the container with its blisters 20, 20 and groove 22.

A flat sheet 44 of thin flexible plastic material is placed on a supporting surface 46, and the formed front wall 18 is superimposed on the sheet 44 with its edges superimposed upon the edges of the sheet 44. An electrically heated member 50 is pressed down upon the overlapped edges thereby sealing the edges, and forming the rear panel 28. Another flat plastic sheet similar to sheet 44 is similarly sealed to the top end of the front wall as viewed in FIG. 2 forming the flap 32. The snap fastener elements 36 and 38 are next fastened to the rear panel 28 and flat 32, respectively, in any suitable manner. The front wall 18 and rear panel 28 and flap 32 define a three-dimensional compartment 54 in the container and the blisters 20, 20 define individual pockets 56, 56 therein.

In use, the flap 32 is opened and an article of manufacture such as a lady's shoe 16 is suitably collapsed and inserted into the compartment 54, parts of the article finding a seat in one of the pockets 56 and the remaining parts in the other pocket, as shown in FIG. 1, thereby forming a package. The package may be readily opened for inspection, examination, or removal of the article inside and the container may be reused as often as desired. The hole 46 provides means for hanging the package on a supporting element such as a nail.

FIGS. 6 and 7 illustrate a modified manner of fastening the flap 32' to the rear panel 28' wherein the top edge of the rear panel is provided with a series of protruding integral loops 36' adapted to coact with the edges of a series of similarly spaced holes 38' formed in the free end edge of the flap 32'.

In FIG. 8, there is shown another modification of the invention including a modified rear panel 28" and a modified flap 32". Panel 28" is shown formed with a series of spaced outstruck curved protuberances 36" along the free edge thereof, and the flap 32" is shown formed with a series of complementary instruck indentures 38" adapted to receive the protuberances 36". A slidable tool 60 is shown for sliding over the indentured edge of the flap 32" to press the indentures around the protuberances 36" for fastening the flap to the rear panel.

While we have illustrated and described the preferred embodiments of our invention, it is to be understood that we do not limit ourselves to the precise constructions herein disclosed and that various changes and modifications may be made within the scope of the invention as defined in the claims.

What is claimed is:

1. A plastic container of the blister type comprising a pair of superimposed sheets, one sheet being substantially circular in shape and formed of semirigid plastic material, with a pair of blisters thereon protruding outwardly thereof, said semirigid sheet constituting a front wall, the other sheet being substantially semi-circular in shape with its circular edges sealed to the edge of the front wall, the remaining straight edge of said semi-circular sheet being unattached, said other semi-circular sheet occupying the major area of the front wall, said semi-circular sheet constituting a rear panel, and a third sheet substantially semi-circular in shape with its circular edges sealed to the remaining edges of the front wall, with its substantially straight edge unattached and overlapping the substantially straight edge of the rear panel, said third sheet constituting a flap, said front wall and rear panel constituting an inner compartment, and means for releasably fastening the flap to the rear panel.

2. A plastic container of the blister type comprising a pair of superimposed sheets, one sheet being substantially circular in shape and formed of semirigid plastic material, with a pair of blisters thereon protruding outwardly thereof, said semirigid sheet constituting a front wall, the other sheet being substantially semi-circular in shape with its circular edges sealed to the edge of the front wall, the remaining straight edge of said semi-circular sheet being unattached, said other semi-circular sheet occupying the major area of the front wall, said semi-circular sheet constituting a rear panel, and a third sheet substantially semi-circular in shape with its circular edges sealed to the remaining edges of the front wall, with its substantially straight edge of the rear panel, said third sheet constituting a flap, said front wall and rear panel constituting an inner compartment, and means for releasably fastening the flap to the rear panel, said releasable fastening means constituted by a snap fastener element on the unattached edge of the rear panel and a complemental snap fastener element on the unattached edge of the flap.

3. A plastic container of the blister type as defined in claim 1 wherein the releasable fastening means comprises a series of spaced integral loops protruding outwardly of the rear panel along its unattached edge, the flap having a series of similarly spaced holes along the unattached edge thereof adapted to receive the loops of the rear panel.

4. A plastic container of the blister type as defined in claim 1 wherein the releasable fastening means comprises a series of spaced integral outstruck protuberances along the unattached edge of the rear panel, and a series of spaced complemental indentures along the unattached edge of the flap.

5. A plastic container of the blister type as defined in claim 1 wherein the releasable fastening means comprises a series of spaced integral outstruck protuberances along the unattached edge of the rear panel, and a series of spaced complemental indentures along the unattached edge of the flap, and means for pressing the indentures over the protuberances.

6. A plastic container of the blister type as defined in claim 1 wherein the releasable fastening means comprises a series of spaced integral outstruck protuberances along the unattached edge of the rear panel, and a series of spaced complemental indentures along the unattached edge of the flap, and a sliding tool slidable over the indentures for pressing the indentures over the protuberances.

References Cited by the Examiner

UNITED STATES PATENTS

| | | | |
|---|---|---|---|
| 2,331,762 | 10/1943 | Brown | 53—30 |
| 2,945,586 | 7/1960 | Mackes | 206—78 |
| 3,088,587 | 5/1963 | Dimmig et al. | 206—78 |
| 3,154,898 | 11/1964 | Engles | 53—30 |

THERON E. CONDON, *Primary Examiner.*

J. B. MARBERT, *Assistant Examiner.*